March 4, 1930.  A. BUSS  1,749,128
AIR RELIEF DEVICE
Filed Feb. 18, 1928
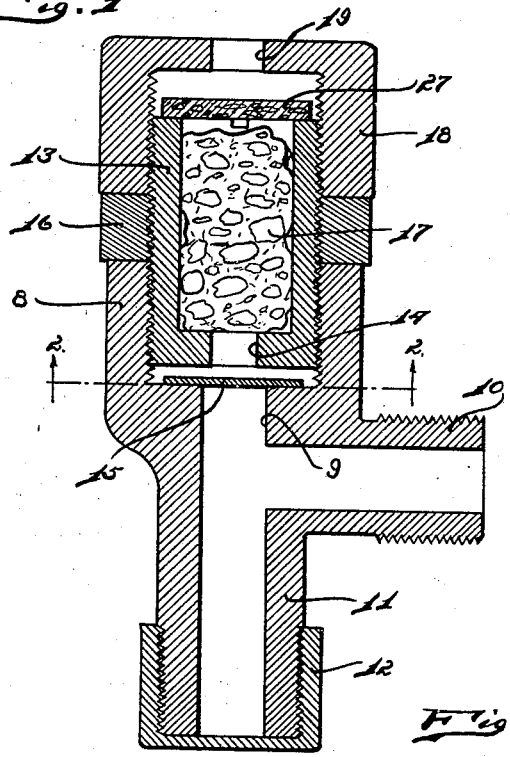
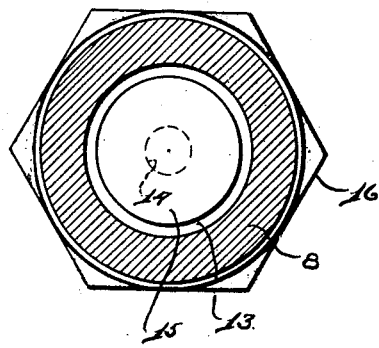
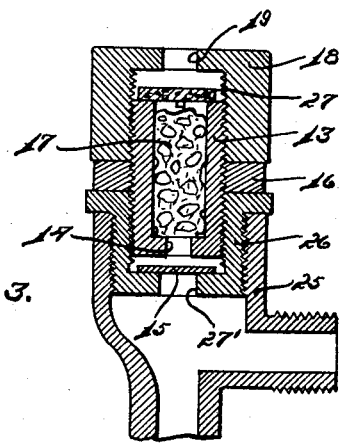
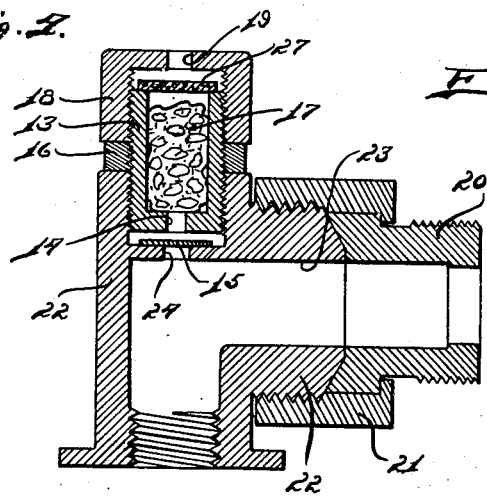
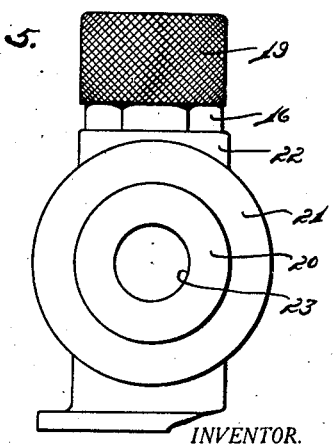
INVENTOR.
August Buss.
BY
ATTORNEY.

Patented Mar. 4, 1930

1,749,128

UNITED STATES PATENT OFFICE

AUGUST BUSS, OF DETROIT, MICHIGAN

AIR-RELIEF DEVICE

Application filed February 18, 1928. Serial No. 255,304.

My invention relates to a new and useful improvement in an air relief device adapted for use particularly on heating systems of the steam or hot water type, although from a description of the invention it will appear evident that the invention may be put to other uses.

It is an object of the present invention to provide a device of this class in which relief or vent may be given to the system with which used to permit the escape of air or other fluids from a container, and at the same time, prevent the escape of liquid therefrom.

It is another object of the invention to provide an air relief or vent having, intermediate its control and the outlet orifice, an absorbent material for absorbing liquids delivered thereto and permitting the passage of gases therethrough.

Another object of the invention is the provision in an air relief vent of an absorbent member and a retainer therefor.

Another object of the invention is the provision of an air relief vent having a control mechanism and supporting means therefor adapted for mounting in various types of fittings or pipes.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention showing it adapted for use as an air vent on a radiator.

Fig. 2 is a sectional view taken on line 2—2 of Fig. 1.

Fig. 3 is a central vertical sectional view of the invention with the adapter attached thereto for mounting in seatless bearing fittings.

Fig. 4 is a central vertical sectional view of the invention adapted for use on a radiator in slightly modified form from that shown in Fig. 1.

Fig. 5 is an end elevational view of the form shown in Fig. 4.

In the form shown in Fig. 1 I have illustrated the invention used with a structure comprising a shell 8 interiorly threaded and communicating through the passage 9 with the laterally extending nipple 10 and the extension 11, a cap 12 being threaded on the extension 11 to serve as a closure. Threaded into the shell 8 is a cup-shaped member 13 having an opening 14 formed centrally therein. Loosely positioned in the shell 8 so as to cover the end of the passage 9 and close communication between its passage and the opening 14 is a disc 15 which may be made from metal or other suitable material. Threaded on the cup-shaped member 13 is a lock nut 16. Positioned in the cup-shaped member is a quantity of absorbent material 17, such as felt, loose wool, or the like. A cap 18 is threaded on the cup-shaped member as a closure and provided with a central opening 19.

In use the device shown in Fig. 1 may be attached as an air relief or vent to a radiator used with a one-pipe or a two-pipe system of heating.

In use the nipple 10 is threaded into the radiator so as to communicate with the interior thereof. With the one-pipe system a cap 12 serves as a closure for the extension 11. The air forced from the radiator by the incoming steam will serve to raise the disc from its seat so that communication is indirectly established between the passage 9 and the opening 14, thus permitting the air access to the inside of the cup-shaped member 13. The absorbent material 17 placed therein is such as to permit a ready passage of the air or other gas therethrough so that the proper venting may be effected. The presence of the material 17, however, will prevent the escape of water or any other liquid from the device, thus avoiding the difficulties which are commonly encountered in many widely used types of radiator valves or vents.

When desired to use the structure shown in Fig. 1 with a two-pipe system of heating the cap 12 is dispensed with and the extension 11 connected to the return pipe.

The form shown in Fig. 4 is particularly adapted for use as an elbow in connection with a radiator used with a two-pipe system of heating. This form, also, when used at the return end of the radiator, will permit the dispensing of the vent which is commonly used in the system adjacent the boiler. The structure and operation of this device is much similar to the structure and operation already described. The nipple 20 would be attached to the radiator and connected by the coupling 21 to the nipple 22. The passageway 23 would then have communication through the opening 24 to the opening 14, the rest of the structure being as previously described.

In Fig. 3 I have shown the invention used with a fitting 25 in which there is no seat or abutment upon which the disc 15 may engage. To utilize the invention with such a fitting it is necessary to use a cup-shaped adapter 26 having an opening 27' formed centrally in its base which communicates with the interior of the fitting 25 with which used. Threaded into the cup-shaped member 26 is the cup-shaped member 13 with all of the component parts already described. The form shown in Fig. 3 is thus adapted for use with fittings of various kinds, it being but necessary to provide the member 26 as an adapter to fit the fitting, such as a T, an L or the like, with which it is intended to use the device, thus making the invention universally adapted as a drip vent in various systems and with various types of fittings.

The forms shown may also be used as circulating drip vents in the circulating pipes of a heating system, it being but necessary to form the member 11 shown in Fig. 1 as a nipple projecting laterally outwardly in alignment with the nipple 10.

If desired, a felt washer 27 may be positioned upon the upper end of the cup-shaped member 13 loosely so as to further protect against the escape of liquid through the opening 19.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. An air relief vent of the class described, comprising: an interiorly threaded member provided with an opening communicating with the system to be vented; a cup-shaped retaining member threaded into said member and provided with an opening in its base, said base being inwardly of said threaded member; a movable closure positioned between the opening in said base and the opening in said interiorly threaded member for opening and closing communication of said opening with said system; and absorbent material contained in said retainer.

2. An air relief vent of the class described, comprising: an interiorly threaded member communicating with the system to be vented; a retaining member threaded into said member and communicating with an opening formed therein with the interior of said member; a movable closure for opening and closing communication of said retainer with said first mentioned member, movable in response to pressure in said system; absorbent material mounted in said retainer in the path of the gases passing therefrom, to the atmosphere; and a cap mounted on said retainer and provided with an opening therein for establishing communication between said retainer and the atmosphere.

3. An air relief vent of the class described, comprising: an interiorly threaded member communicating with the system to be vented; a retaining member threaded into said member and communicating with an opening formed therein with the interior of said member; a movable closure for opening and closing communication of said retainer with said first mentioned member, movable in response to pressure in said system; absorbent material mounted in said retainer in the path of the gases passing therefrom, to the atmosphere; a cap mounted on said retainer and provided with an opening therein for establishing communication between said retainer and the atmosphere; and a movable closure for the upper end of said retainer positioned in said cap and movable for establishing communication between said retainer and the atmosphere.

4. An air relief vent of the class described comprising: an interiorly threaded member communicating with the system to be vented; a cup-shaped retaining member having its base threaded into said member and communicating with an opening formed in its base with the interior of said member; a movable closure for opening and closing communication of said retainer with said first mentioned member movable in response to pressure in said system; a cap mounted on said retainer and provided with an opening therein for establishing communication between said retainer and said atmosphere; and a movable closure for the open end of said retaining member and loosely positioned between said open end and the opening in said cap.

In testimony whereof I have signed the foregoing specification.

AUGUST BUSS.